United States Patent
Beach et al.

(10) Patent No.: US 9,621,423 B1
(45) Date of Patent: *Apr. 11, 2017

(54) METHODS AND APPARATUS FOR AUTOMATING SERVICE LIFECYCLE MANAGEMENT

(71) Applicant: EMC Corporation, Hopkinton, MA (US)

(72) Inventors: Nathan B. Beach, Richardson, TX (US); David A. Gillam, The Colony, TX (US); Frederick Crable, Allen, TX (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 186 days.

This patent is subject to a terminal disclaimer.

(21) Appl. No.: 14/534,416

(22) Filed: Nov. 6, 2014

Related U.S. Application Data

(63) Continuation of application No. 13/536,705, filed on Jun. 28, 2012, now Pat. No. 8,918,493.

(51) Int. Cl.
*G06F 15/173* (2006.01)
*H04L 12/24* (2006.01)
*H04L 29/12* (2006.01)

(52) U.S. Cl.
CPC ...... *H04L 41/0823* (2013.01); *H04L 61/6068* (2013.01)

(58) Field of Classification Search
CPC .................... H04L 41/0823; H04L 61/6068
USPC ........................................................ 709/223
See application file for complete search history.

(56) References Cited

U.S. PATENT DOCUMENTS

| 7,194,538 | B1 | 3/2007 | Rabe et al. |
| 7,516,285 | B1* | 4/2009 | Haynes ............ G06F 17/30197 711/162 |
| 8,874,749 | B1 | 10/2014 | Vittal et al. |
| 8,898,507 | B1 | 11/2014 | Crable et al. |
| 2002/0129230 | A1* | 9/2002 | Albright ........... G06F 15/17343 713/1 |
| 2003/0069972 | A1 | 4/2003 | Yoshimura et al. |
| 2003/0081598 | A1 | 5/2003 | Bresniker |
| 2003/0126242 | A1* | 7/2003 | Chang ................... G06F 9/4416 709/222 |
| 2006/0095435 | A1 | 5/2006 | Johnson et al. |

(Continued)

OTHER PUBLICATIONS

U.S. Appl. No. 13/435,317 Notice of Allowance dated Jul. 6, 2015, 8 pages.

(Continued)

*Primary Examiner* — Joseph E Avellino
*Assistant Examiner* — Marshall McLeod
(74) *Attorney, Agent, or Firm* — Daly, Crowley, Mofford & Durkee, LLP

(57) ABSTRACT

Methods and apparatus to provide, in a cloud infrastructure environment having a compute layer, a network layer, a storage layer, and management layer, wherein the management layer has no knowledge of at least some of existing infrastructure services, selecting hosts containing host bus adapters and/or network adapters having unique identifiers, using the unique identifiers to analyze the storage layer for: storage groups having host initiators that match the unique identifiers of the host bus adaptors, and/or network file storage (NFS) exports exposed to the unique identifiers as client IP addresses.

12 Claims, 16 Drawing Sheets

(56) References Cited

U.S. PATENT DOCUMENTS

| | | | |
|---|---|---|---|
| 2006/0112247 A1* | 5/2006 | Ramany | G06F 3/0605 |
| | | | 711/165 |
| 2009/0276771 A1 | 11/2009 | Nickolov et al. | |
| 2011/0022812 A1 | 1/2011 | Van der Linden et al. | |
| 2011/0252420 A1 | 10/2011 | Tung et al. | |
| 2013/0055249 A1 | 2/2013 | Vaghani et al. | |

OTHER PUBLICATIONS

U.S. Appl. No. 13/435,146 Office Action dated Nov. 5, 2015, 29 pages.
Response dated Nov. 5, 2015 to Office Action dated Oct. 8, 2015; For U.S. Appl. No. 14/037,474; 3 pages.
U.S. Appl. No. 13/435,146 Amendment filed Feb. 4, 2016, 10 pages.
Response filed Jun. 8, 2015; to Office Action dated Feb. 11, 2015; for U.S. Appl. No. 13/435,317.
U.S. Appl. No. 13/435,146 Response to Final Office Action filed on Aug. 5, 2016, 12 pages.
U.S. Appl. No. 13/435,146, filed Mar. 30, 2012, Crable.
U.S. Appl. No. 13/435,317, filed Mar. 30, 2012, Prabhakara, et al.
U.S. Appl. No. 13/536,705, filed Jun. 28, 2012, Beach, et al.
U.S. Appl. No. 13/629,017, filed Sep. 27, 2012, Crable, et al.
U.S. Appl. No. 14/534,416, filed Nov. 6, 2014, Beach et al.
Best Practices for Deploying VMware vCloud Director on Vblock Infrastructure Platforms, Sep. 2011, The Virtual Computing Environment Company, www.vce.com, 20 pages.
Cisco Unified Computing System and EMC VNXe3300 Unified Storage System, White Paper, Jan. 2011, Revision 1.0, $EMC^2$, Cisco Systems, Inc., 170 West Tasman Drive, San Jose, CA 95134-1706, www.cisco.com, 9 pages.
EMC Fast VP for Unified Storage Systems, A Detailed Review, White Paper, Oct. 2011, EMC Corporation, 26 pages.
EMC Integrated Infrastructure for VMware Enabled by EMC VNXe3100 and VMware vSphere 4.1, An Architectural Overview, White Paper, EMC Global Solutions, $EMC^2$, Feb. 2011, 24 pages.
Service Catalog Strategies for Vblock™ Infrastructure Platforms, IaaS COE, Jan. 2011, The Virtual Computing Environment Company, www.vce.com, 19 pages.
Unified Infrastructure Manager/Provisioning, © 2011 VCE Company, The Virtual Computing Environment Company, www.vce.com, 3 pages.
Vblock Infrastructure Platforms Series 300 Architecture Overview, Version 2.4, Aug. 2011, The Virtual Computing Environment Company, www.vce.com, 74 pages.
Vblock™ Infrastructure Platforms 2010 Vblock Platforms Architecture Overview, Version 1.3, Nov. 2011, The Virtual Computing Environment Company, www.vce.com, 25 pages.
Vblock™ Infrastructure Platforms Technical Overview, © 2011 VCE Company, The Virtual Computing Environment Company, www.vce.com, 8 pages.
Vblock™ Solution for Trusted Multi-Tenancy: Technical Overview, Aug. 2011, The Virtual Computing Environment Company, www.vce.com, 75 pages.
VMware vStorage APIs for Array Integration with EMC VNX Series for NAS, Benefits of EMC VNX for File Integration with VMware VAAI, White Paper, EMC Solutions Group, Jan. 2012, $EMC^2$, 17 pages.
Notice of Allowance dated Oct. 28, 2014, U.S. Appl. No. 13/536,705, 14 pages.
Notice of Allowance dated Sep. 2, 2014, U.S. Appl. No. 13/629,017, 18 pages.
Office Action dated Aug. 15, 2013, U.S. Appl. No. 13/435,146, 27 pages.
Office Action dated Aug. 8, 2013, U.S. Appl. No. 13/435,317, 18 pages.
Office Action dated Feb. 11, 2015, U.S. Appl. No. 13/435,317, 22 pages.
Office Action dated Mar. 27, 2014, U.S. Appl. No. 13/536,705, 15 pages.
Office Action dated May 1, 2014, U.S. Appl. No. 13/435,146, 28 pages.
Office Action dated May 9, 2014, U.S. Appl. No. 13/435,317, 27 pages.
Response filed Dec. 12, 2013, U.S. Appl. No. 13/435,146, 17 pages.
Response filed Dec. 23, 2013, U.S. Appl. No. 13/435,317, 11 pages.
Response filed Jul. 21, 2014, U.S. Appl. No. 13/536,705, 8 pages.
Response filed on Nov. 10, 2014, U.S. Appl. No. 13/435,317, 10 pages.
Response filed on Oct. 30, 2014, U.S. Appl. No. 13/435,146, 13 pages.
U.S. Final Office Action dated May 5, 2016 corresponding to U.S. Appl. No. 13/435,146; 28 Pages.
U.S. Appl. No. 13/435,146 Notice of Allowance dated Aug. 22, 2016, 19 pages.

* cited by examiner

METHODS AND APPARATUS FOR AUTOMATING SERVICE LIFECYCLE MANAGEMENT

CROSS REFERENCE TO RELATED APPLICATIONS

The present application is a continuation of U.S. patent application Ser. No. 13/536,705, filed on Jun. 28, 2012, which is incorporated herein by reference.

BACKGROUND

As is known in the art, cloud computing infrastructure systems contain a varied collection of servers ("hosts"), storage systems ("storage arrays"), networking devices, software modules and other components. Sets of hosts, networking devices, and storage arrays assembled in close proximity make up a unit of cloud infrastructure sometimes referred to as a pod ("pod") of devices. The pod components are physically connected via Ethernet networks.

The logical configuration of pod components and networks creates platforms that are sold or leased as services from a menu of predefined configuration offerings ("service offerings") for consumers of cloud computing. Offerings from vendors define the type, quantity, and quality of resources, such as "three servers with two network cards, 16 gigabytes of memory, four processors, and 20 gigabytes of boot disk space each, and a high performance 200 gigabyte storage volume shared between the servers." The instantiation of such an offering is considered an "infrastructure service". Defining services in this manner enables the consumer to use a selected portion of the host and storage resources within a given cloud infrastructure pod.

The instantiation of a service offering typically includes selected physical resources of the compute, storage, and compute layers into the logical concept of an "infrastructure service", as discussed above. A separate management layer can also exist in the cloud infrastructure environment that engages in mediation with the physical cloud resource layers to instantiate and manage service offerings into cloud infrastructure services based on the desired resource types, quantities, and quality of resource.

SUMMARY

In one aspect of the invention, a method comprises: in a cloud infrastructure environment having a compute layer, a network layer, a storage layer, and management layer, wherein the management layer has no knowledge of at least some of existing infrastructure services, selecting hosts containing host bus adapters and/or network adapters having unique identifiers, using the unique identifiers to analyze the storage layer for: storage groups having host initiators that match the unique identifiers of the host bus adaptors; and/or network file storage (NFS) exports exposed to the unique identifiers as client IP addresses.

The method can further include one or more of the following features: the unique identifiers comprise world wide port names (WWPNs) and/or Internet protocol (IP) network adapters configured with IP addresses, using storage ports in the storage groups with unique identifiers for the hosts to identify potential zones in a fabric of the storage area network (SAN), wherein the presence as zone members of one or more of the storage ports and one of the HBAs identified by one of the WWPNs in one of the zones indicates the zone can be in use as a SAN path in a cloud infrastructure service, through mediation with the compute layer, determining which storage volume and storage group should be used to boot the selected host, presence in the storage layer of an NFS export with a host IP address in a client list indicates the NFS export should be used as file storage in the cloud infrastructure service, the storage volumes are potentially visible to and in use by other hosts in the cloud infrastructure environment, wherein the occurrence of at least one of the storage volumes being visible to and in use by more than one of the hosts in the cloud infrastructure environment indicates that the hosts form a cluster of hosts, the hosts identified as potential clusters of hosts are validated for adherence to business rules in the management layer including: each host in the potential cluster recognizing the exact same shared storage volumes (SAN-based and/or NFS-based), and each host in the environment having identical network configuration including: the same number of host bus adapters with matching names, the same number of network adapters with matching names, and the same VLANs configured on each relative network adapter across hosts, one or more discovered cloud infrastructure services are adapted for and adopted into a data model of the management layer for continued service lifecycle management, and wherein any adopted cloud infrastructure service acts as if it had originally been fully configured and provisioned by the management layer into which it has been model adapted, the adopted service is analyzed for compatibility with an existing service offering in the cloud environment management layer, and if compatible, associated with the existing service offering, and/or a new service template is extrapolated from the structure and quality of service requirements of the adopted service and created as a new service offering in the cloud management layer.

In another aspect of the invention, an article comprises: a computer readable medium containing non-transitory stored instructions that enable a machine to perform: in a cloud infrastructure environment having a compute layer, a network layer, a storage layer, and management layer, wherein the management layer has no knowledge of at least some of existing infrastructure services, selecting hosts containing host bus adapters and/or network adapters having unique identifiers, and using the unique identifiers to analyze the storage layer for: storage groups having host initiators that match the unique identifiers of the host bus adaptors; and/or network file storage (NFS) exports exposed to the unique identifiers as client IP addresses.

The article can further include one or more of the following features: the unique identifiers comprise world wide port names (WWPNs) and/or Internet protocol (IP) network adapters configured with IP addresses, instructions for using storage ports in the storage groups with unique identifiers for the hosts to identify potential zones in a fabric of the storage area network (SAN), wherein the presence as zone members of one or more of the storage ports and one of the HBAs identified by one of the WWPNs in one of the zones indicates the zone can be in use as a SAN path in a cloud infrastructure service, instructions, through mediation with the compute layer, for determining which storage volume and storage group should be used to boot the selected host, presence in the storage layer of an NFS export with a host IP address in a client list indicates the NFS export should be used as file storage in the cloud infrastructure service, the storage volumes are potentially visible to and in use by other hosts in the cloud infrastructure environment, wherein the occurrence of at least one of the storage volumes being visible to and in use by more than one of the hosts in the cloud infrastructure environment indicates that the hosts form a cluster of hosts, the hosts identified as potential clusters of hosts are validated for adherence to business rules in the management layer including: each host in the potential cluster recognizing the exact same shared storage volumes (SAN-based and/or NFS-based), and each host in the environment having identical network configuration including: the same number of host bus adapters with matching names, the same number of network adapters with matching names, and the same VLANs configured on each relative network adapter across hosts, one or more discovered cloud infrastructure services are adapted for and adopted into a data model of the management layer for continued service lifecycle management, and wherein any adopted cloud infrastructure service acts as if it had originally been fully configured and provisioned by the management layer into which it has been model adapted, and/or the adopted service is analyzed for compatibility with an existing service offering in the cloud environment management layer, and if compatible, associated with the existing service offering.

In a further aspect of the invention, a system comprises: a processor, and a memory coupled to the processor containing stored instructions to enable the system, in a cloud infrastructure environment having a compute layer, a network layer, a storage layer, and management layer, wherein the management layer has no knowledge of at least some of existing infrastructure services, to: select hosts containing host bus adapters and/or network adapters having unique identifiers, use the unique identifiers to analyze the storage layer for: storage groups having host initiators that match the unique identifiers of the host bus adaptors, and/or network file storage (NFS) exports exposed to the unique identifiers as client IP addresses.

BRIEF DESCRIPTION OF THE DRAWINGS

The foregoing features of this invention, as well as the invention itself, may be more fully understood from the following description of the drawings in which.

DETAILED DESCRIPTION

Figure 1:
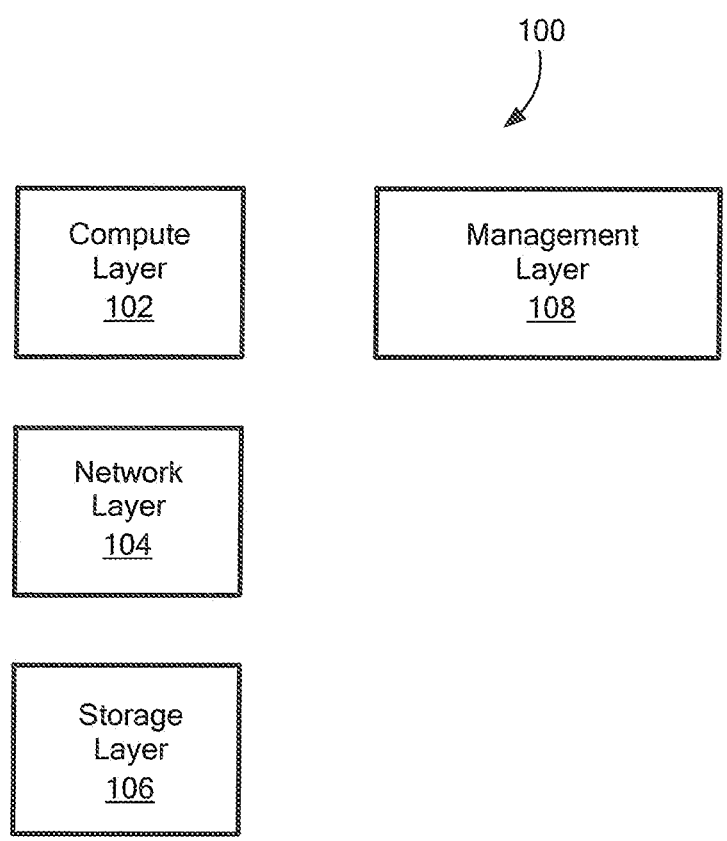
FIG. 1 is a high level schematic representation of a cloud storage system having automated service life management in accordance with exemplary embodiments of the invention.

Prior to describing exemplary embodiments of the invention, some introductory information is provided. Service discovery and adoption is the process of discovering, validating, and adapting existing cloud infrastructure into the management layer for the purpose of automating infrastructure service lifecycle management.

This process involves:
1) discovering existing compute, network, and storage layer components present in a cloud infrastructure pod;
2) analyzing the pod component configurations for relationships ("network paths") between the compute and storage layers in the storage area network ("SAN") and network file system ("NFS") configuration;
3) sorting selected parts of the environment into logical infrastructure services ("clusters of hosts") based on shared storage volumes;
4) validating potential clusters of hosts for the business requirements of the cloud infrastructure management layer;
5) adapting them to the model of the cloud infrastructure management layer, and/or
6) extrapolating from the adopted service a new service offering or associating it with a known service offering in the management layer.

Host Identification

The starting point of the service discovery and adoption methodology is identifying the unique compute layer networking component identifiers. The unique identifiers appear in the environment in the form of host bus adapters ("HBA") world wide port names ("WWPNs") for hosts configured with SAN storage, or in the form of IP addresses for hosts configured with network attached storage. A host can be configured with either or both storage types.

SAN Storage Path Discovery

The storage layer is analyzed to find host initiators in the storage array's storage group mapping configuration with WWPN identifiers matching those found at the compute layer. The term "host initiator" is analogous to the term "HBA" in the storage layer. Any combination of a host initiator WWPN and storage port WWPN in a storage mapping configuration container (such as a "storage group") is considered to be a potential SAN Zone.

The resulting set of potential zones is used in analyzing the network layer SAN fabric zoning configuration. If a zone found on a SAN fabric switch contains both the host initiator WWPN and the storage port WWPN of a potential zone, a true zone has been identified as in use by a potential infrastructure service in the environment. A cloud infrastructure service will typically have at least two zones configured per HBA, one in each SAN fabric, for a total of four zones per host.

If SAN-based host booting is employed (rather than local disk boot on the host), the process can engage in mediation with the compute layer to determine which storage volume in the SAN is used for booting the host. The storage array storage group containing this storage volume is considered the "boot storage group."

NFS Storage Path Discovery

In a similar manner, the starting point of the service adoption methodology for NFS configuration is identifying the unique NFS network IP address for each host in the cloud infrastructure pod. The NFS exports in the network attached storage devices are examined to find those with a matching IP address in their access client lists. Any NFS export with a matching IP address in its client lists is considered a candidate for adoption into an infrastructure service.

Host Storage Volume Collection

Storage volumes visible for a given host are collected from any volumes present in storage groups visible to the host via SAN zoning and/or from NFS exports visible to the host via IP routing as discovered during the SAN and NFS storage path discovery steps above.

Cluster Identification

After the storage volumes visible to each host have been identified, the hosts can be sorted into sets of hosts ("clusters") based on shared storage volumes. Any storage volume that is visible via SAN zoning or IP routing to more than one host is considered a potential shared data volume. These shared storage volumes are the fundamental criteria for determining clusters of hosts.

Cluster Validation

In order for a set of hosts to be identified safely as a valid cluster for continued lifecycle management, the hosts should satisfy cross-host validation criteria in the storage and compute layers. This validation is determined by the management layer and could include, but is not limited to, the following:

At the storage layer, it should be required that every host in the potential cluster has access to the exact same shared data volumes. In the case of SAN storage, each of these storage volumes should be mapped to the exact same host logical unit number ("LUN") for every host. This validation requirement does not pertain to host boot storage volumes, as they will have a one-to-one mapping between host and storage volume.

At the compute layer, hosts in a potential cluster should be configured with the exact same number of network interface cards ("NICs"), and each NIC should be configured in an identical manner relative to their ordering on the hosts. For example, if a given host has two configured NICs each named "eth0" and "eth1", all the other hosts in the cluster should have NICs each configured with the same NIC names and the exact same virtual local area networks ("VLANs") on each relative NIC. The term "relative" in this context implies that each NIC named "eth0" should have the same VLANs configured on each host. Likewise, "eth1" could also be present on every host, possibly with different VLANs from "eth0", but "eth1" NIC should have an identical VLAN configuration across each host.

Modeling an Infrastructure Service

Once a set of hosts passes cluster validation, the resulting assemblage of compute layer hosts, network layer configuration, and storage layer resources is the logical representation of a cloud infrastructure service cluster, as extracted from an existing cloud infrastructure environment.

At this point, the discovered service can be adapted into an existing cloud management layer domain model. If the components of the discovered service satisfy the configuration and quality of service requirements of an existing service offering in the management layer, the discovered service can be associated with an existing service offering. Otherwise, a service offering can be extrapolated from the discovered service by templatizing the computer, storage, and network components.

Once the discovered service has been adapted to the management layer model, it should be fully available for continued lifecycle management as if it were originally provisioned by the management layer.

FIG. 1 shows an exemplary cloud storage environment 100 having a compute layer 102, a network layer 104, a storage layer 106, and a management layer 108 having discovering, validating, and adapting cloud infrastructure into the cloud management layer in accordance with exemplary embodiments of the invention. The environment may be referred to as a platform. It is understood that any practical number of platforms can be combined into a cloud storage environment.

The compute layer 102 comprises components, such as blade servers, chassis and network interconnects that provide the computing power for the platform. The storage layer 106 comprises the storage components for the platform. The network layer 104 comprises the components that provide switching and routing between the compute and storage layers 102, 106 within and between platforms, and to the client or customer network.

Figure 2:
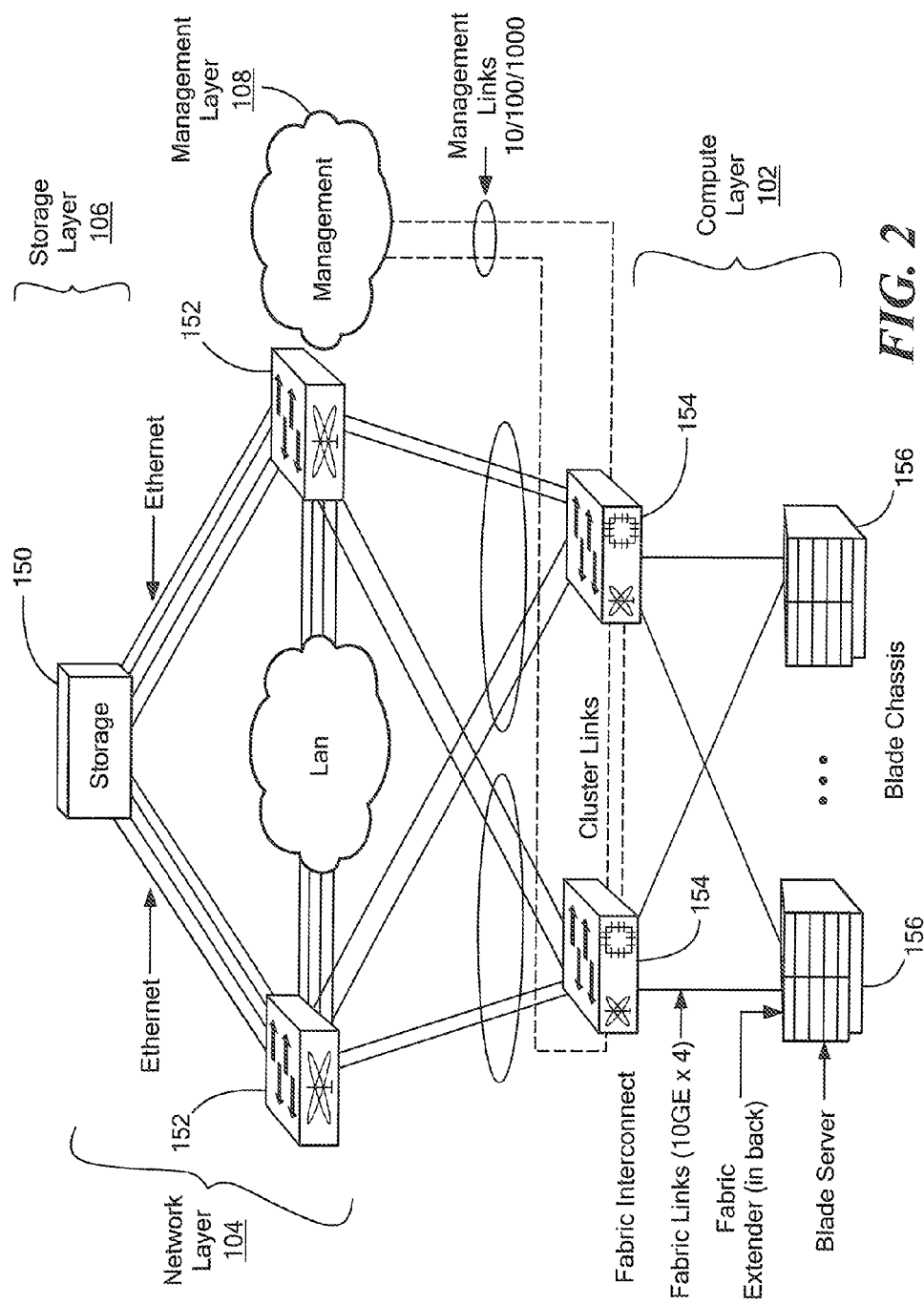
FIG. 2 is a schematic representation showing further detail of the cloud storage system of FIG. 1.

FIG. 2 shows further detail for the environment 100 of FIG. 1. The storage layer 106 can include storage components 150, such as CLARIION storage components from EMC Corporation of Hopkinton Mass. The network layer 104 can include a pair of switches 152, such as Nexus 5000 Series Ethernet Switches from Cisco of San Jose, Calif., coupled to the storage components and to a LAN. The compute layer 102 can include a pair of fabric interconnects 154, such as CISCO 6100 series devices. The compute layer can further include a number of blade servers 156, such as CISCO 5100 blade chassis. The management layer 108 can be coupled to the compute layer 102.

Figure 3:
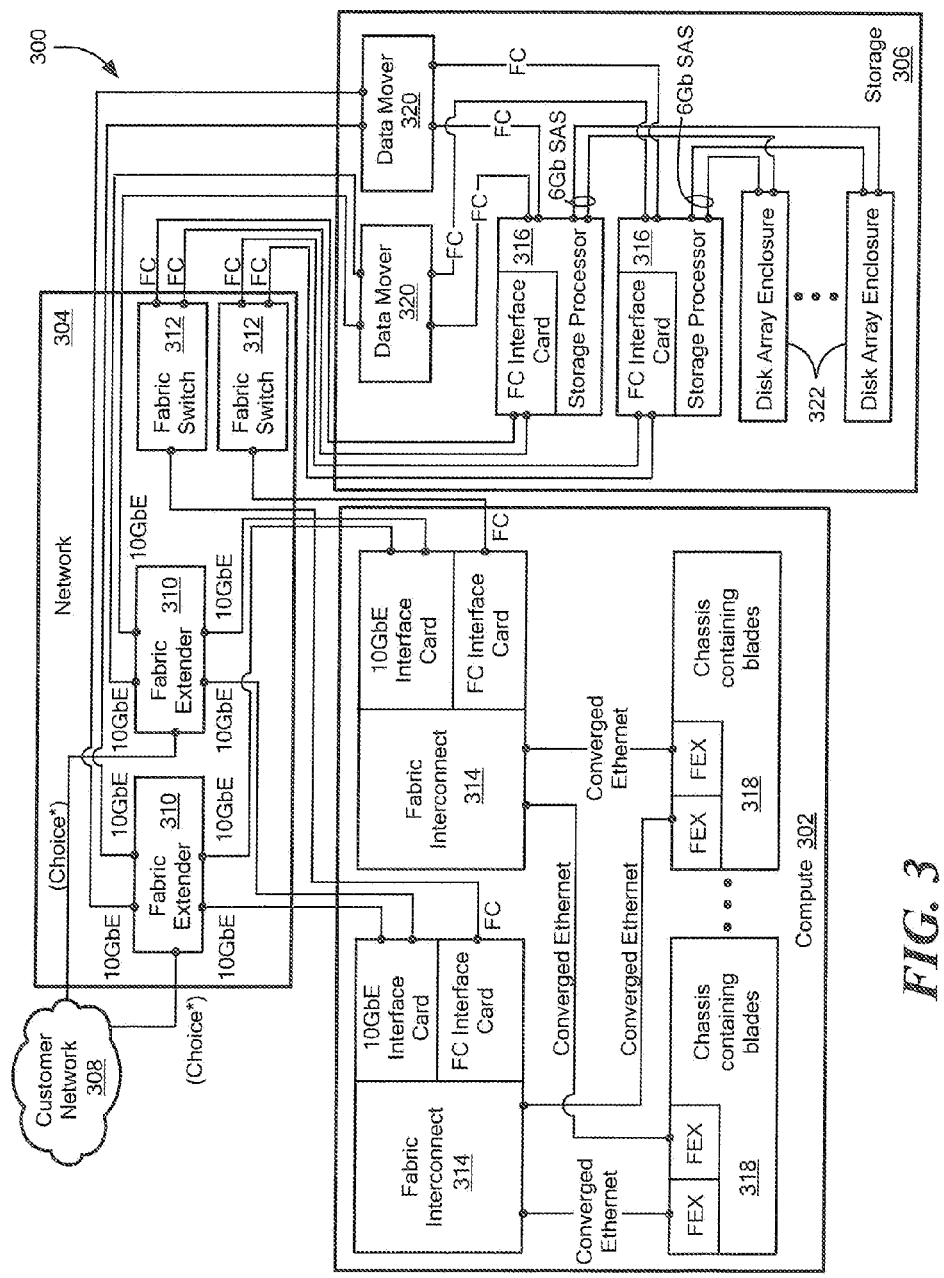
FIG. 3 is a schematic representation showing further detail of the cloud storage system if FIG. 2.
Figure 4:
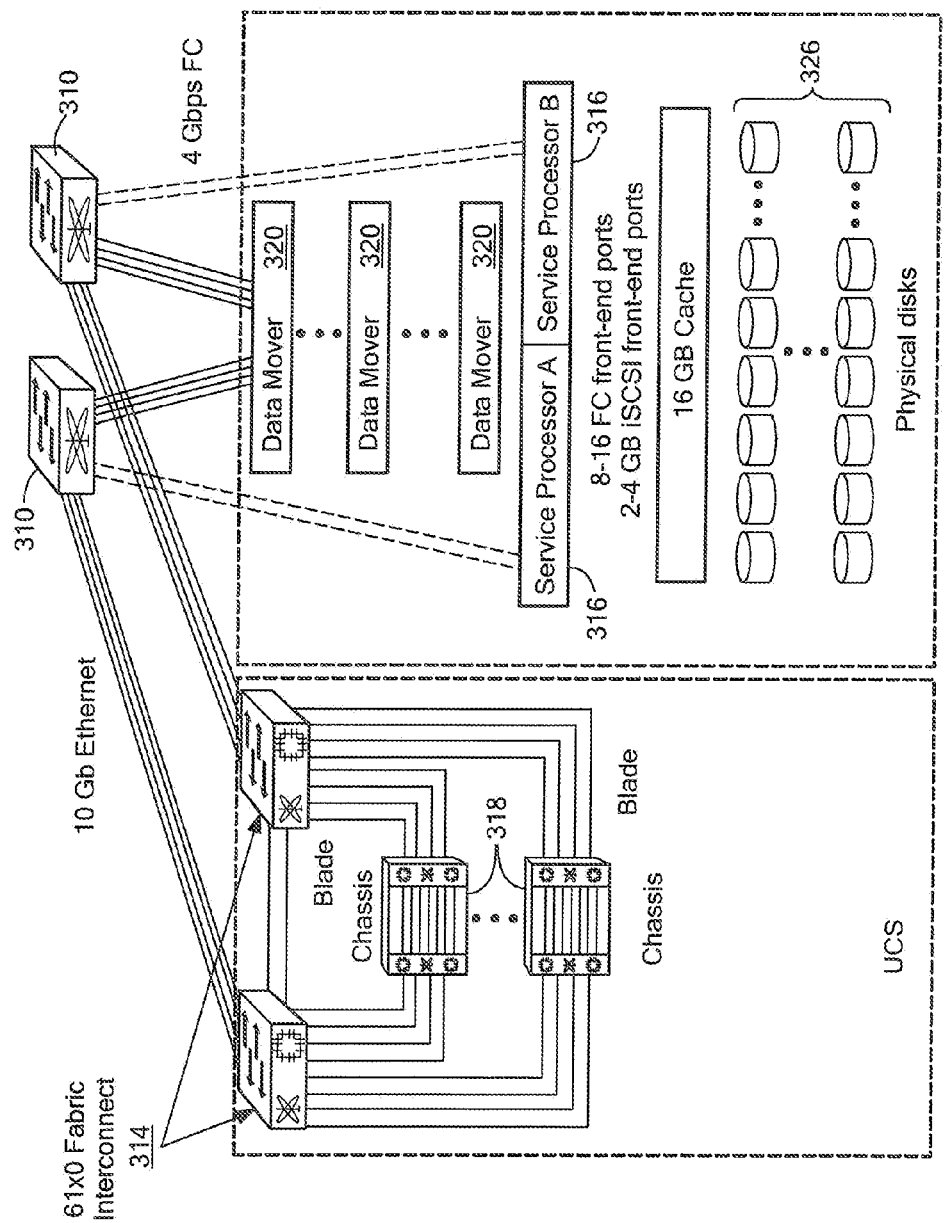
FIG. 4 is a schematic representation showing further detail of a storage layer of the cloud storage system of FIG. 3.

FIG. 3 shows further detail of an exemplary cloud environment having a compute layer 302, a network layer 304 and a storage layer 306. The network layer 302 is coupled to a customer network 308 in a manner known in the art. The network layer 302 includes switches 310 coupled to the customer network 308. The network layer 302 also includes multilayer fabric switches 312 coupled to fabric interconnects 314 in the compute layer 302 and to storage processors 316 in the storage layer 306. The fabric interconnects 314 are coupled to blade server chassis 318 containing blades. Data movers 320 in the storage layer 306 are coupled between the storage processors 316 and the switches 310 in the network layer. Disk array enclosures 322 are coupled to the storage processors 316. FIG. 4 shows interconnections for a system similar to that shown in FIG. 3 with physical disks 326. In the illustrated embodiment, the storage layer includes 8 to 16 front end fibre channel ports and 2-4 GB iSCSI front end ports and 2 to 4 Data Mover compute notes containing Ethernet adaptors.

It is understood that a variety of other configurations having different interconnections and storage configuration can be provided to meet the needs of a particular application.

The management layer can include a number of applications to perform various functions for overall control, configuration, etc. of the various platform components. For example, management applications can include a virtualization function, such as vSphere/vCenter, by VMware of Palto Alto, Calif. A further management application can be provided as part of the Unified Computing System (UCS) by Cisco. It is understood that the blade chassis and fabric interconnection can be considered part of the UCS. Another management application can includes a management interface, such as EMC Unisphere, to provide a flexible, integrated experience for managing existing storage systems, such as CLARIION and CELERRA storage devices from EMC. A further management application includes a platform element manager, such as unified infrastructure manager (UIM) by EMC, for managing the configuration, provisioning, and compliance of the platform.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed mean a generic product, function, or module.

Figure 5:
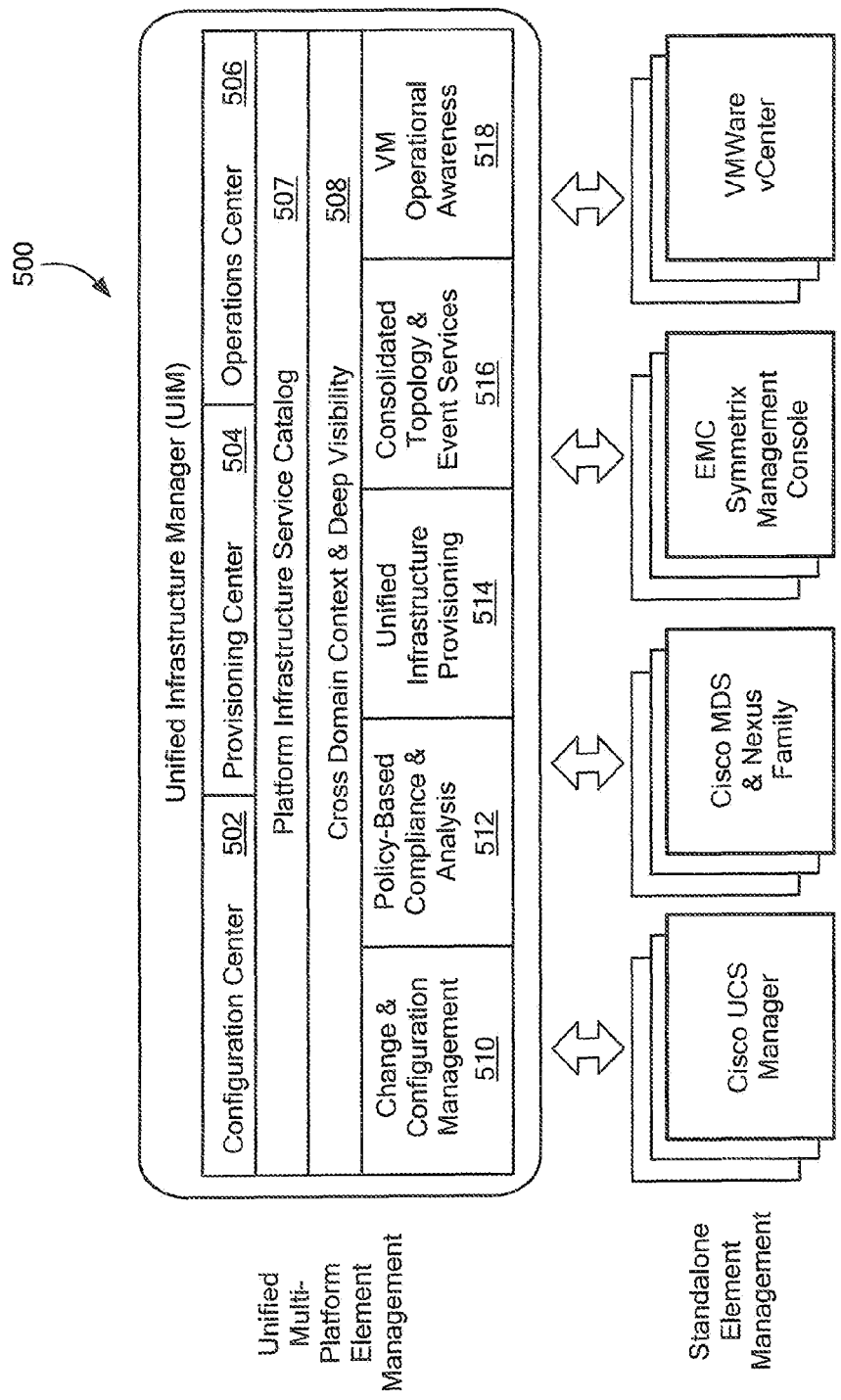
FIG. 5 is a schematic representation of a unified infrastructure manager (UIM) module.

FIG. 5 shows an exemplary unified infrastructure manager 500 having discovering, validating, and adapting cloud infrastructure in accordance with exemplary embodiments of the invention. In an exemplary embodiment, the unified infrastructure manager 500 includes a configuration center module 502, a provisioning center module 504, and an operations center module 506. Below these modules is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage layers, and other management applications. The unified infrastructure manager 500 performs platform deployment by abstracting the overall provisioning aspect of the platform(s) and offering granular access to platform components for trouble shooting and fault management.

Figure 6:
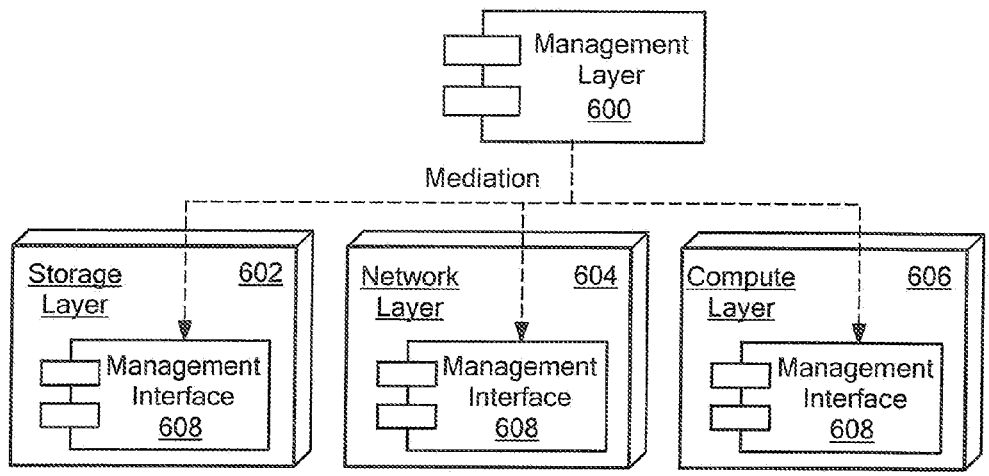
FIG. 6 is a schematic representation of layers having a management interface.

FIG. 6 shows a management/service layer 600 connected to a storage layer 602, a network layer 604, and a compute layer 606, each having a respective management interface layer 609. In general, the management layer 600 uses device native interfaces provided by the equipment vendor to translate desired configuration settings into actual configuration settings. The native interface is directly related to the equipment vendor. In one embodiment, the service management layer 600 uses native command line interfaces (CLI) provided by software components the equipment manufacturer supplies or using application programming interfaces (APIs) to send commands to the management interface using messaging protocols. The API defines a programming language binding for executing configuration instructions. In both cases the equipment manufacturer supplies computer software that drives the management interface. In the case of the CLI, the commands are either executed on the operating system hosting the management layer and communicating to the device over proprietary protocols or run on the operating system hosting the device management interface. CLIs typically take properties sets and return results in textual or encoded formats such as XML.

Example:
naviseccli -h 192.168.101.40 bind r5 0 -rg 0 -cap 20 -rc 1 -sp a -sq gb -wc 1

APIs provide a native computer programming language binding that can be executed from the native computer programming language. Java is a widely used language in computer programming and many vendors provide java language libraries and examples to execute commands against the management interface of their devices.

Figure 7:
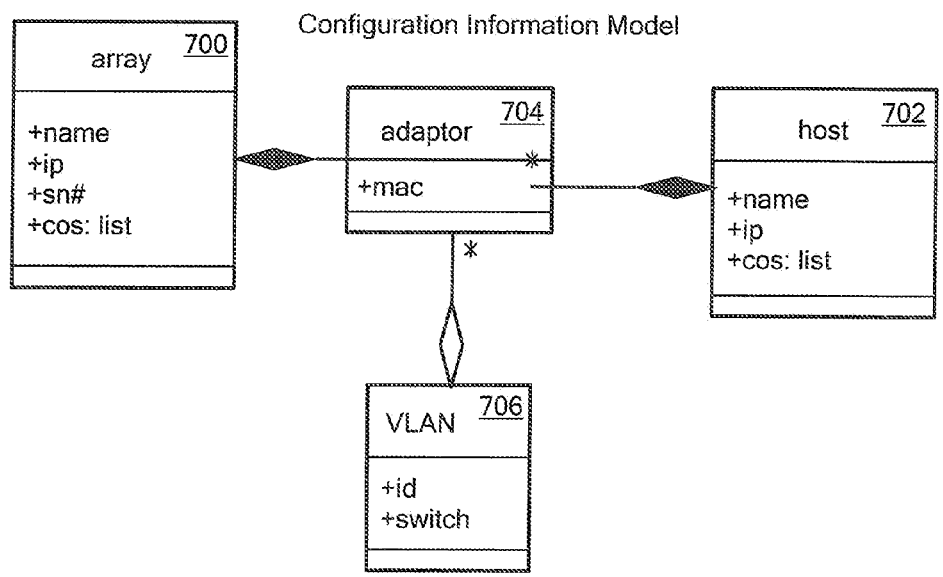
FIG. 7 is a representation of a configuration information model.

FIG. 7 shows a model of the physical information stored within the management layer of the components in FIG. 1. An array model component 700 contains properties that describe the pod and management information for the array. A host model component 702 contains properties that describe the pod and management information for the host. Instances of an adaptor model component 704 are associated with arrays and hosts to indicate the array or host has an Ethernet adaptor. Hosts and arrays may have many adaptors. Adaptors 704 may have additional detailed properties that indicate the identifier for the adaptor and network profiles indicating the IP addresses and MAC addresses of the adaptor. Instances of VLAN model components 706 are loosely associated with the adaptors representing the logical network connectivity between the adaptor and the other adaptors associated to that VLAN.

Figure 8:
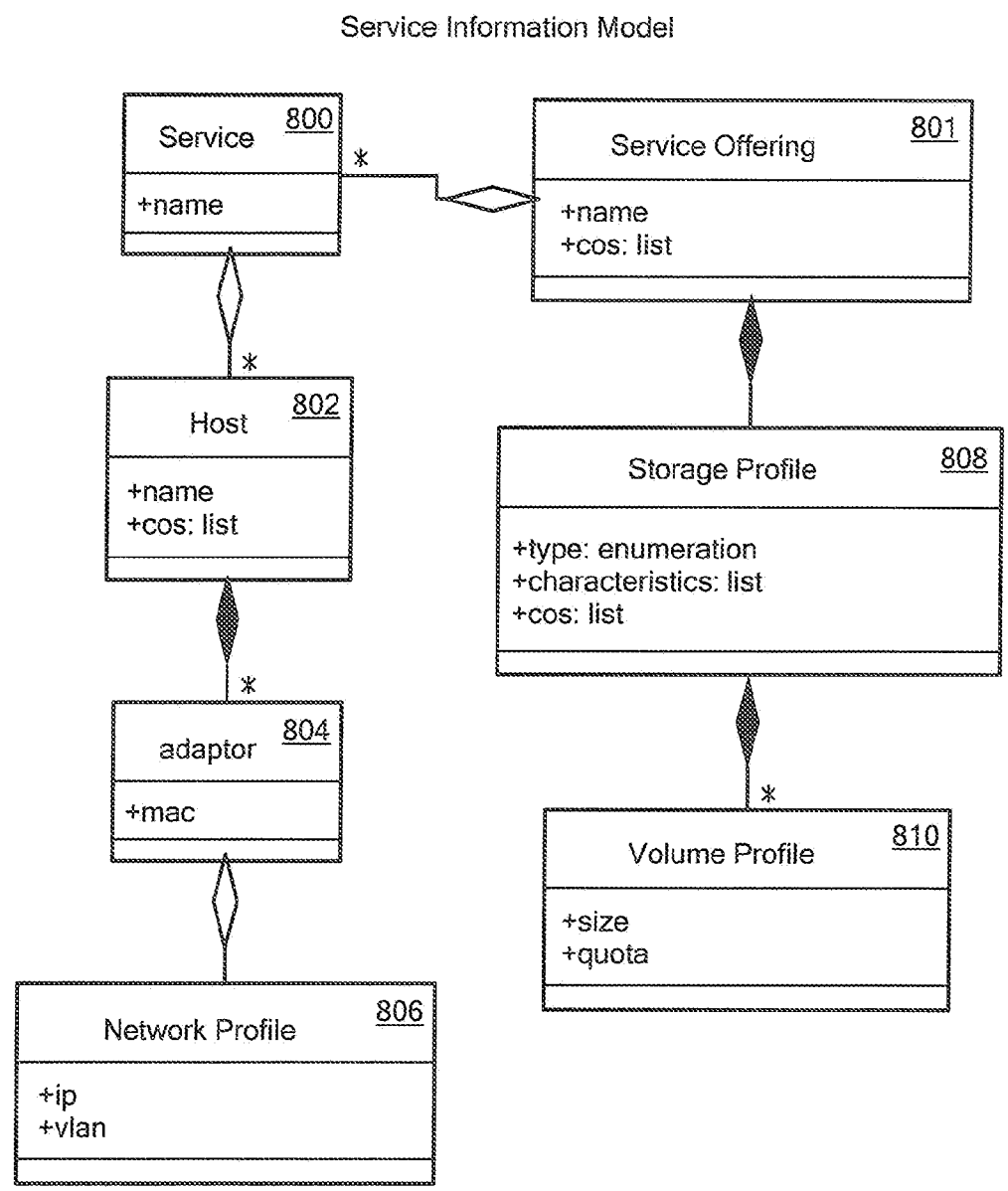
FIG. 8 is representation showing a service configuration model.
Figure 8A:
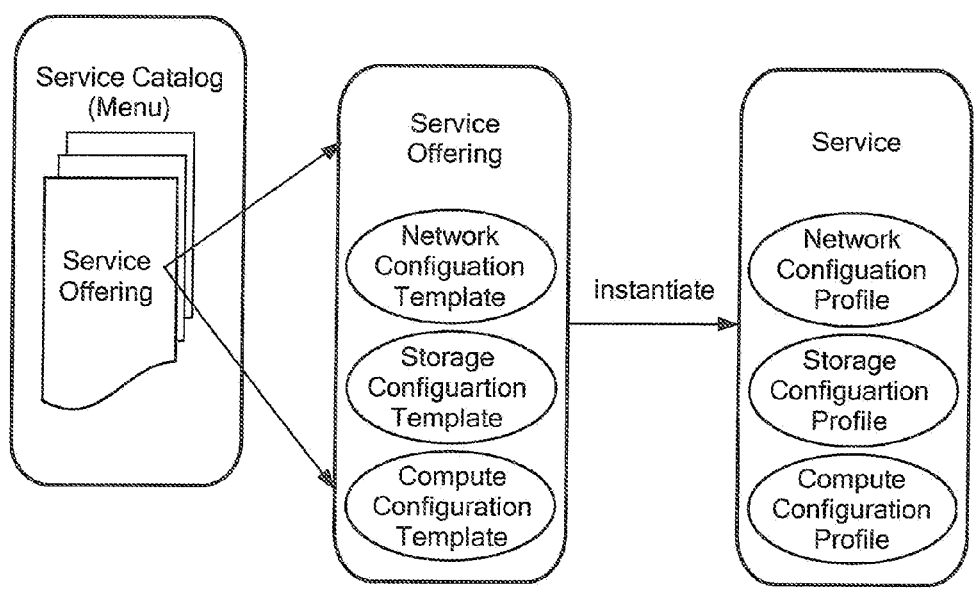
FIG. 8A is representation of a service catalog menu and service offerings.

FIG. 8 shows a model of the service and offering information stored within the management layer of the components in FIG. 7. A service 800 is a representation of a desired service as described by a service offering 801. An exemplary relationship is shown in FIG. 8A where the service properties as described in the offering are used to describe the characteristics and properties of the service to be created. A service catalog has a menu of service offerings, each having network configuration settings, service configuration settings, and compute configuration settings.

Referring again to FIG. 8, one or more hosts 802 are associated with a service to fulfill the compute requirements of the service. One or more network adaptors 804 are associated with a service to indicate the need for Ethernet connectivity to a network. A network profile 806 is associated with each adaptor 804 that indicates the VLAN and IP address required to fulfill the storage connectivity using the Ethernet. This network profile 806 is associated to a storage profile 808 to indicate that the host is to obtain storage from a network with this VLAN and IP network.

The service offering 801 is used to hold the relationships and detailed description for the user to choose the offering from a menu of offerings. The storage profile 808 is associated with the offering 801 to indicate the class of storage and service settings for the storage to be configured such as features like de-duplication, write once read many, auto-extension, maximum auto-extensions, thin provisioning, etc. A volume profile 810 is associated with the storage profile 808 to indicate specific volume properties and characteristics such as size and quota limitations.

Figure 9:
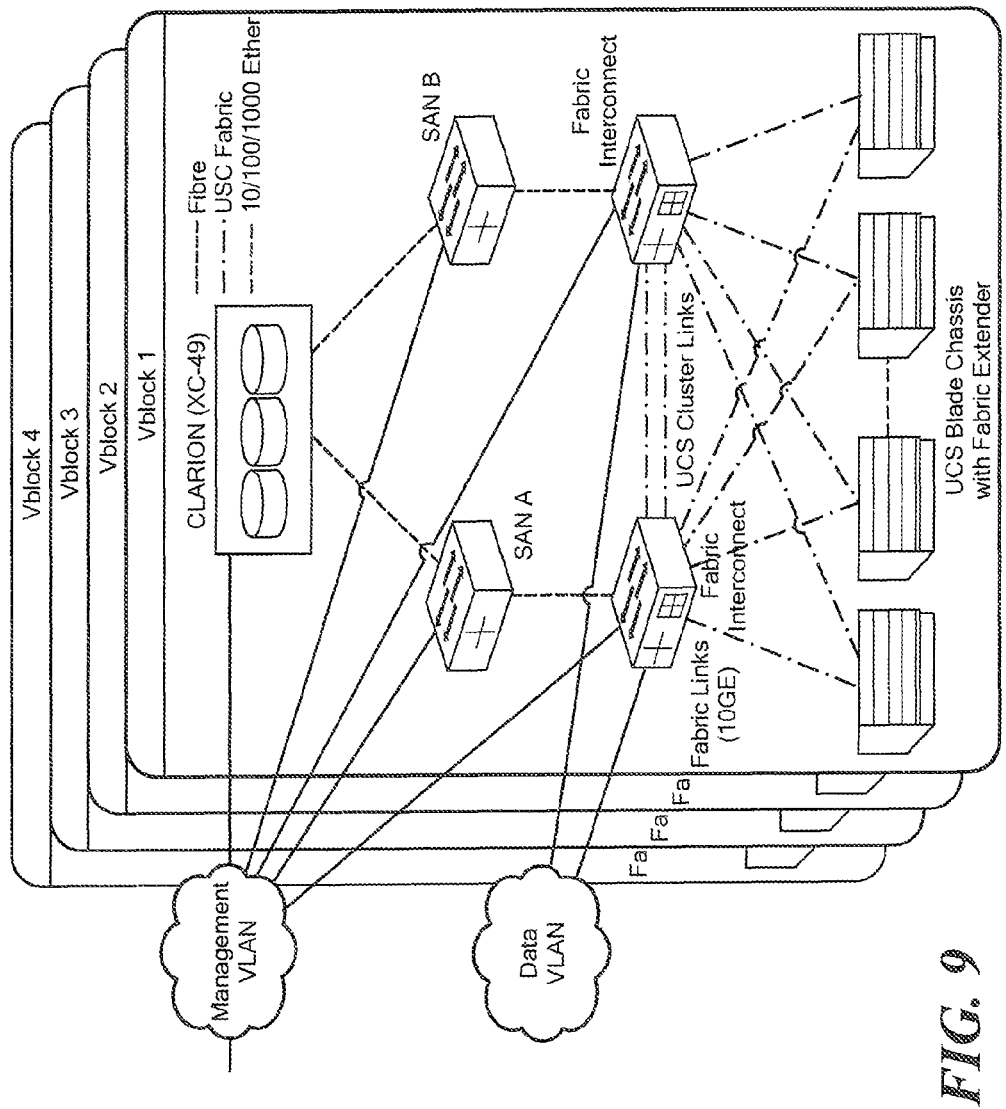
FIG. 9 is a schematic representation showing pods in a cloud environment.
Figure 10:
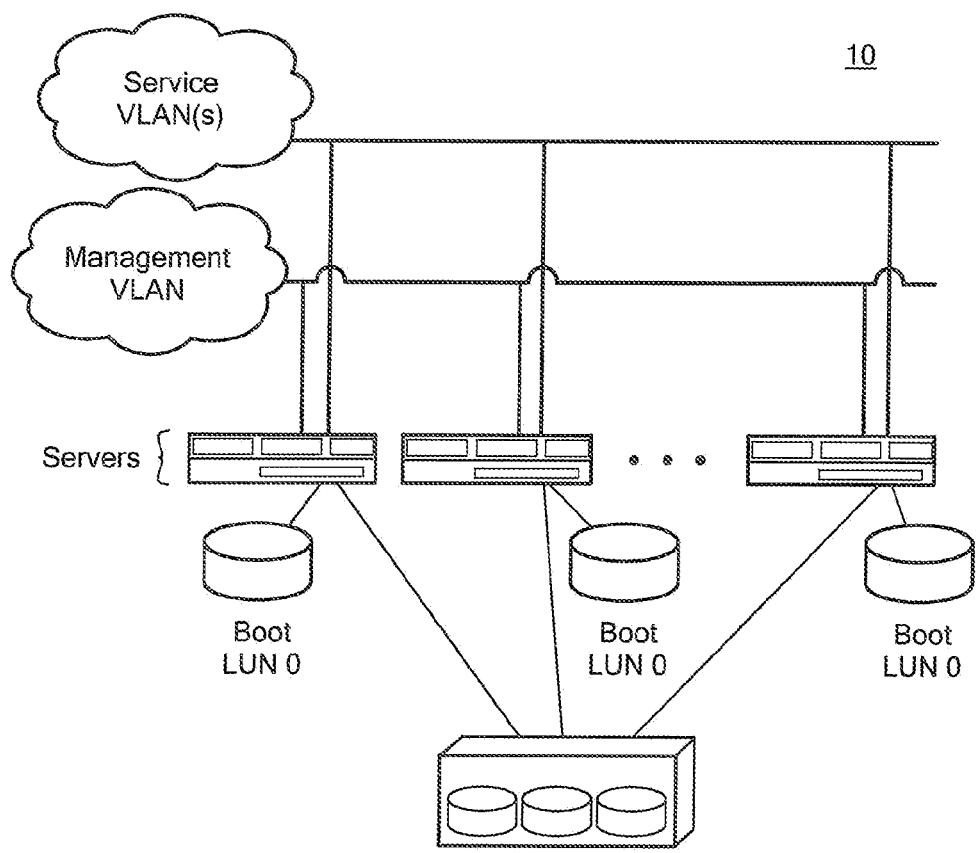
FIG. 10 is a schematic representation of service and management VLANs, servers, and storage.

FIG. 9 shows a series of "PODs" used to create cloud infrastructures, where each Vblock is considered its own POD. FIG. 10 shows a set of servers in a POD arranged in a cluster with shared storage.

Figure 11:
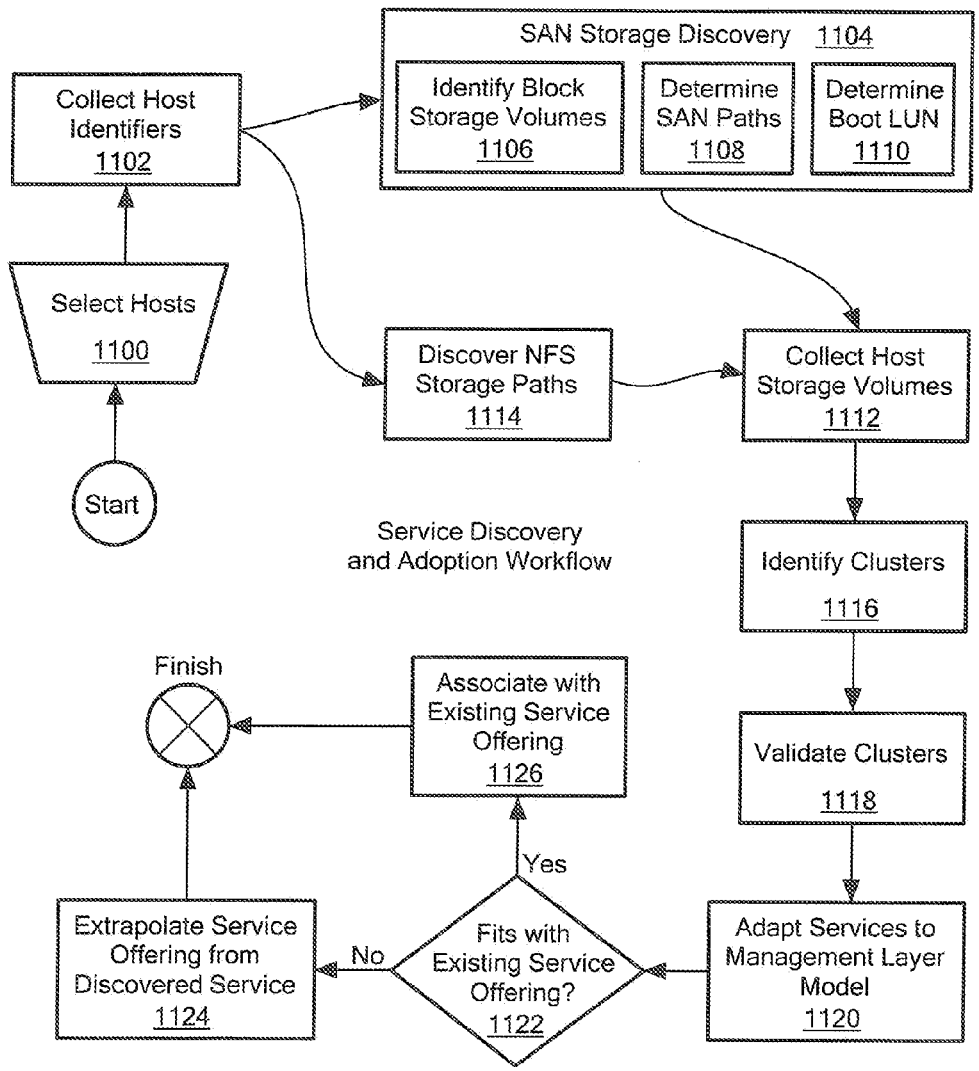
FIG. 11 is a flow diagram showing a flow of events during adoption of an infrastructure service.

FIG. 11 shows an exemplary sequence of steps taken during the discovery and adoption of a service into the management layer of a cloud environment. In step 1100, hosts are selected from which a service may be derived. In step 1102, the unique identifiers (WWPNs and IP Addresses) are collected from each host.

Processing then splits into discovery of block storage in the SAN fabrics 1104 and file storage paths in the NFS environment 1114. The SAN discovery 1104 includes identifying block storage volumes 1106, discovering the existing zoning/SAN paths 1108, and determining the boot volume 1110. After SAN and NFS storage 1104, 1114 has been discovered, the visible storage volumes are collected for each host in step 1112.

Based on the presence of storage volumes (block and/or file) shared across hosts, one or more clusters of hosts can be identified in the cloud environment in step 1116. In step 1118, the cluster is validated to meet the management layer's requirements, e.g., size, storage type QoS, etc., for a manageable service to be adapted into the management layer's model in step 1120. In step 1122, it is determined whether or not the service can be associated with a service offering that already exists in the management layer. If not, in step 1124 a service offering can be extrapolated from the structure of the discovered service and provided to a user. If so, in step 1126, the cluster is associated with existing service offerings.

Figure 12A:
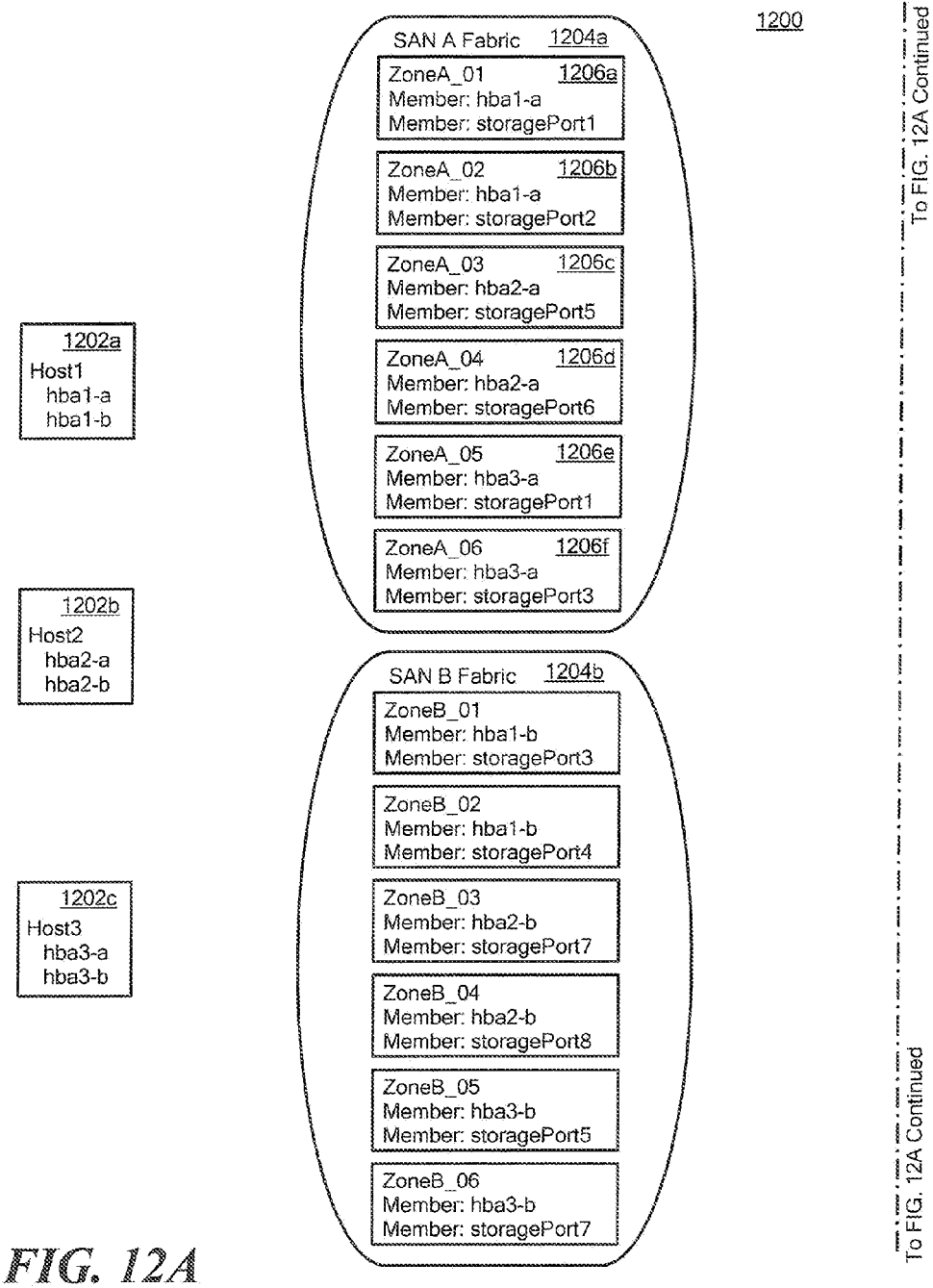
FIG. 12A is a representation of a cloud environment without SAN paths identified.
Figure 12A:
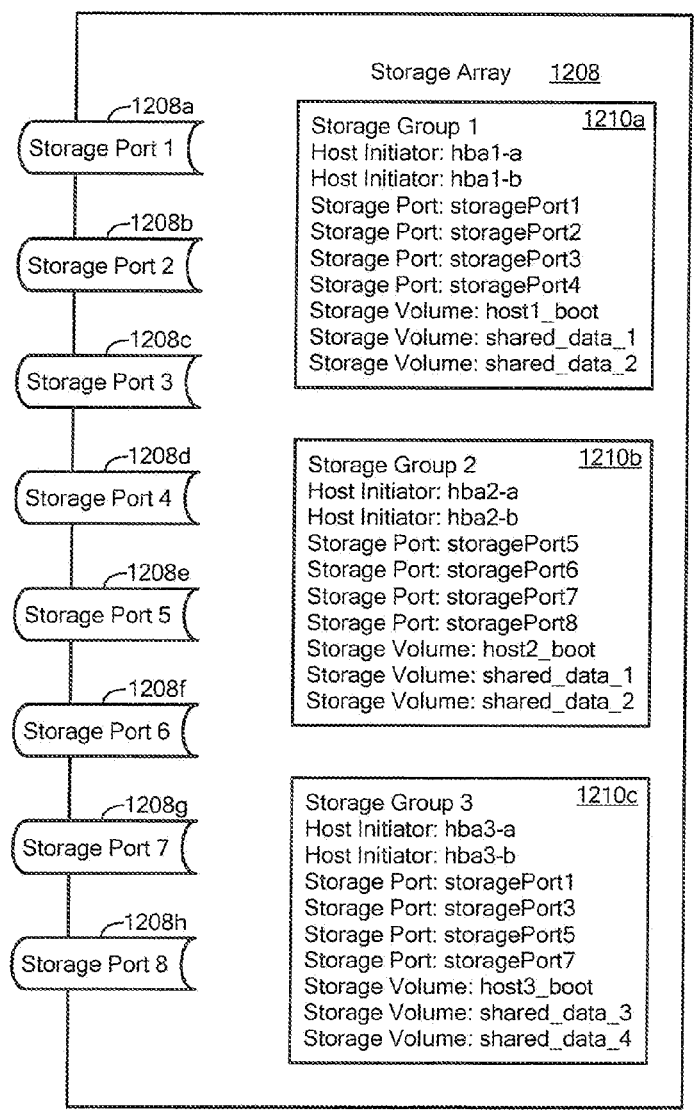

FIG. 12A shows the layout of an exemplary cloud environment 1200 for an existing cluster with shared data, before SAN paths have been discovered in the environment. On the left side, hosts 1202*a,b,c* are shown that are available for discovery, each containing first and second HBAs with one intended to connect into each SAN fabric. For example, the first host 1202*a* includes a first HBA hba1-a and a second HBA hba1-b. The second host includes hba2-a and hba2-b, and so on.

In the middle of the page is shown existing zoning in first and second fabrics 1204*a,b*. In the illustrated embodiment, the first fabric 1204*a* has six zones 1206*a-f*. Standard practice for SAN zoning is to have two zones existing per HBA in each fabric, for a total of four possible paths between host and storage array. On the right side of the page is shown the storage array configuration 1208. The array has eight storage ports 1210*a-h* and a number of storage groups 1210*a-c* containing host bus adapters, storage ports, a boot storage volume, and some shared storage volumes, as shown.

Figure 12B:
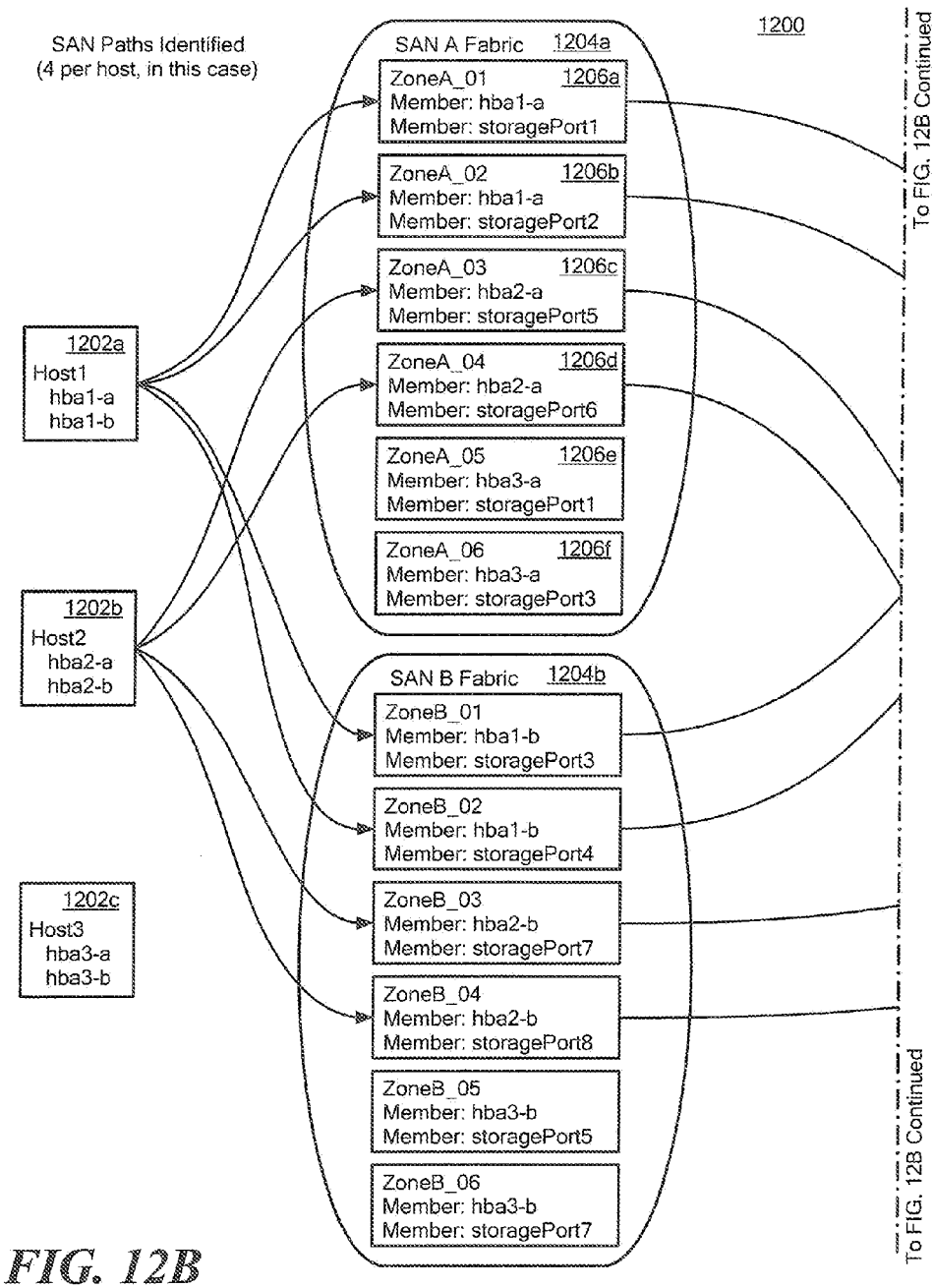
FIG. 12B is a representation of an exemplary service having SAN paths discovered in a cloud environment.
Figure 12B:
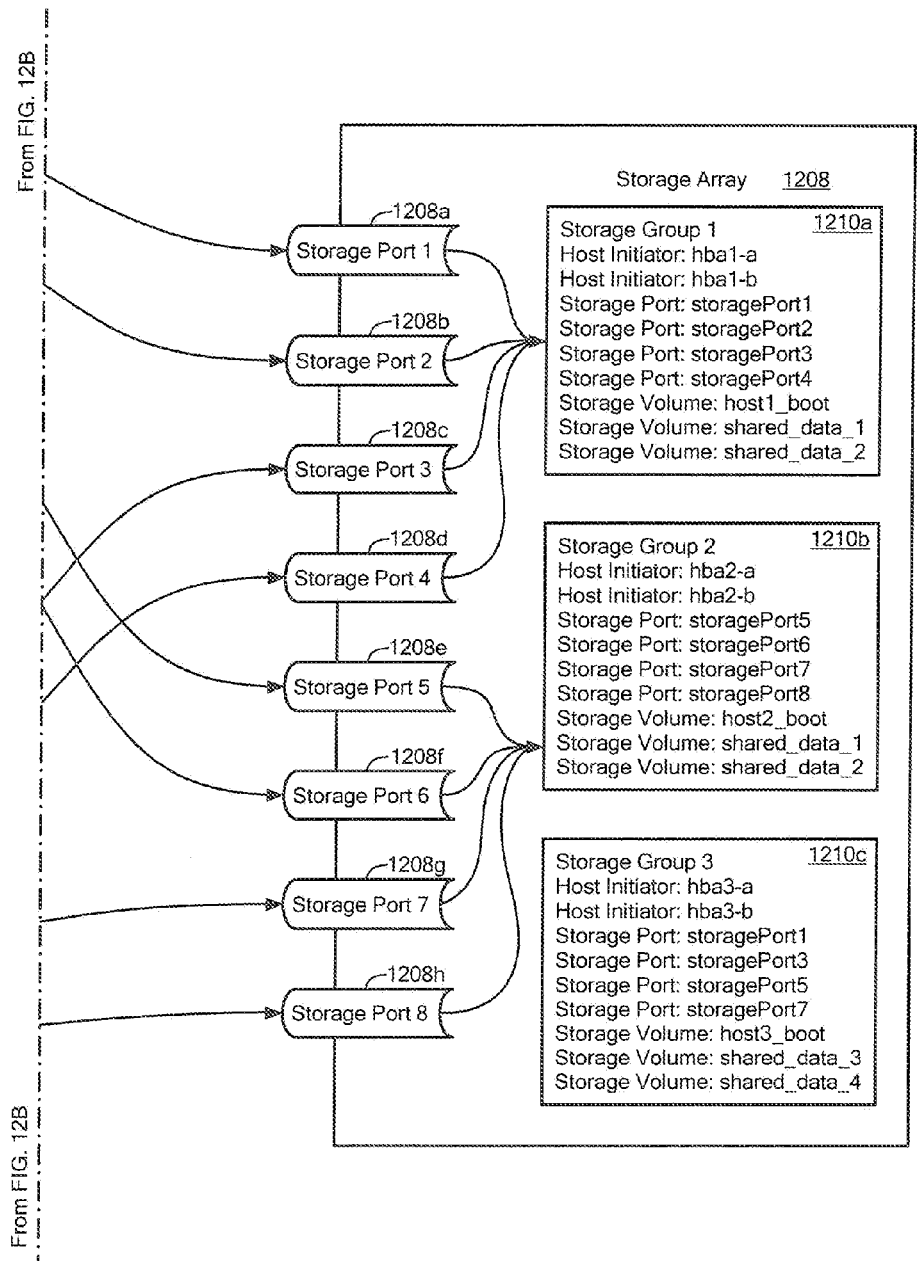

FIG. 12B shows an exemplary cluster after SAN paths have been discovered. In an exemplary embodiment, the process starts with the host bus adapters in the hosts. Next, the system finds storage groups in the storage array containing the host bus adapters. The system then takes the storage ports from the found storage group and finds zones in the fabrics that contain both the host bus adapter and one (or more) of the storage ports. At that point, a valid SAN path has been found. This process should be repeated until all SAN paths have been found.

Figure 13:
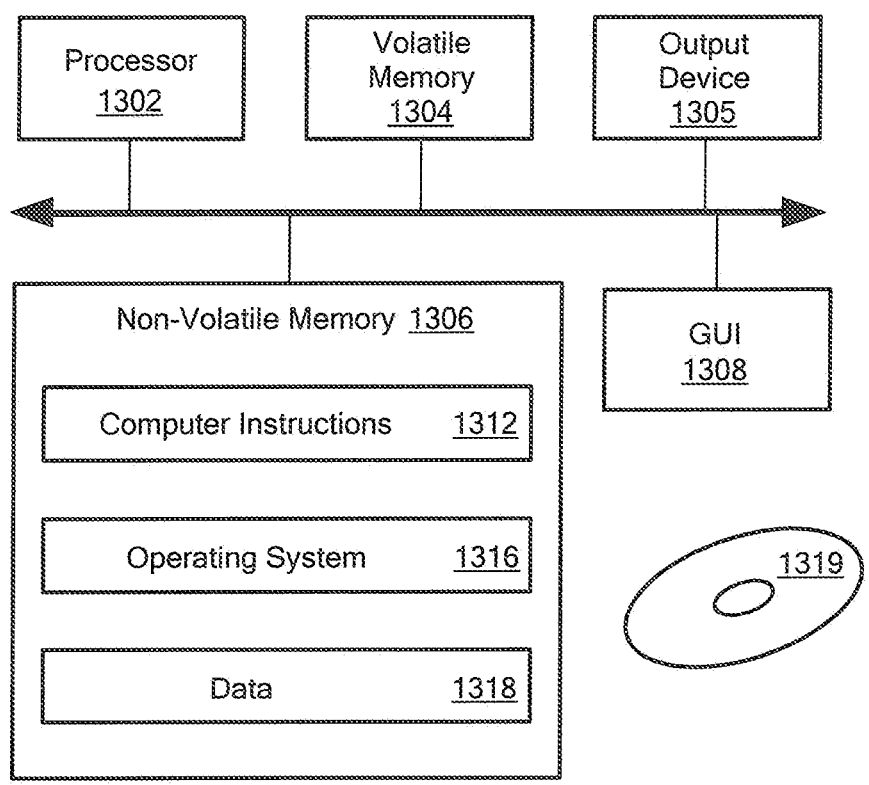
FIG. 13 is a schematic representation of an exemplary computer that can perform at least part of the processing described herein.

FIG. 13 shows an exemplary computer that can perform at least a part of the processing described herein. A computer includes a processor 1302, a volatile memory 1304, an output device 1305, a non-volatile memory 1306 (e.g., hard disk), and a graphical user interface (GUI) 1308 (e.g., a mouse, a keyboard, a display, for example). The non-volatile memory 1306 stores computer instructions 1312, an operating system 1316 and data 1318, for example. In one example, the computer instructions 1312 are executed by the processor 1302 out of volatile memory 1304 to perform all or part of the processing described above. An article 1319 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
in a cloud infrastructure environment having a compute layer, a network layer, a storage layer, and management layer, wherein the management layer has no knowledge of at least some of existing infrastructure services,
selecting hosts containing host bus adapters and/or network adapters having unique identifiers, wherein the unique identifiers comprise world wide port names (WWPNs) and/or Internet protocol (IP) network adapters configured with IP addresses;
using the unique identifiers to analyze the storage layer for:
storage groups having host initiators that match the unique identifiers of the host bus adaptors; and/or
network file storage (NFS) exports exposed to the unique identifiers as client IP addresses; and
using storage ports in the storage groups with unique identifiers for the hosts to identify potential zones in a fabric of the storage area network (SAN), wherein the presence as zone members of one or more of the storage ports and one of the HBAs identified by one of the WWPNs in one of the zones indicates the zone can be in use as a SAN path in a cloud infrastructure service,
wherein the storage volumes are potentially visible to and in use by other hosts in the cloud infrastructure environment, wherein the occurrence of at least one of the storage volumes being visible to and in use by more than one of the hosts in the cloud infrastructure environment indicates that the hosts form a cluster of hosts, and
wherein the hosts identified as potential clusters of hosts are validated for adherence to business rules in the management layer including:
each host in the potential cluster recognizing the exact same shared storage volumes (SAN-based and/or NFS-based); and
each host in the environment having identical network configuration including:
the same number of host bus adapters with matching names;
the same number of network adapters with matching names; and
the same VLANs configured on each relative network adapter across hosts.

2. The method according to claim 1, further including, through mediation with the compute layer, determining which storage volume and storage group should be used to boot the selected host.

3. The method according to claim 1, wherein presence in the storage layer of an NFS export with a host IP address in a client list indicates the NFS export should be used as file storage in the cloud infrastructure service.

4. The method according to claim 1, wherein one or more discovered cloud infrastructure services are adapted for and adopted into a data model of the management layer for continued service lifecycle management, and
    wherein any adopted cloud infrastructure service acts as if it had originally been fully configured and provisioned by the management layer into which it has been model adapted.

5. The method according to claim 4, wherein the adopted service is analyzed for compatibility with an existing service offering in the cloud environment management layer, and if compatible, associated with the existing service offering.

6. The method according to claim 4, where a new service template is extrapolated from the structure and quality of service requirements of the adopted service and created as a new service offering in the cloud management layer.

7. An article, comprising:
    a non-transitory computer readable medium containing stored instructions that enable a machine to perform:
    in a cloud infrastructure environment having a compute layer, a network layer, a storage layer, and management layer, wherein the management layer has no knowledge of at least some of existing infrastructure services,
    selecting hosts containing host bus adapters and/or network adapters having unique identifiers, wherein the unique identifiers comprise world wide port names (WWPNs) and/or Internet protocol (IP) network adapters configured with IP addresses; and
    using the unique identifiers to analyze the storage layer for:
storage groups having host initiators that match the unique identifiers of the host bus adaptors; and/or
    network file storage (NFS) exports exposed to the unique identifiers as client IP addresses; and
    using storage ports in the storage groups with unique identifiers for the hosts to identify potential zones in a fabric of the storage area network (SAN), wherein the presence as zone members of one or more of the storage ports and one of the HBAs identified by one of the WWPNs in one of the zones indicates the zone can be in use as a SAN path in a cloud infrastructure service,
    wherein the storage volumes are potentially visible to and in use by other hosts in the cloud infrastructure environment, wherein the occurrence of at least one of the storage volumes being visible to and in use by more than one of the hosts in the cloud infrastructure environment indicates that the hosts form a cluster of hosts, and
    wherein the hosts identified as potential clusters of hosts are validated for adherence to business rules in the management layer including:
    each host in the potential cluster recognizing the exact same shared storage volumes (SAN-based and/or NFS-based); and
    each host in the environment having identical network configuration including:
        the same number of host bus adapters with matching names;
        the same number of network adapters with matching names; and
        the same VLANs configured on each relative network adapter across hosts.

8. The article according to claim 7, further including instructions, through mediation with the compute layer, for determining which storage volume and storage group should be used to boot the selected host.

9. The article according to claim 7, wherein presence in the storage layer of an NFS export with a host IP address in a client list indicates the NFS export should be used as file storage in the cloud infrastructure service.

10. The article according to claim 7, wherein one or more discovered cloud infrastructure services are adapted for and adopted into a data model of the management layer for continued service lifecycle management, and
    wherein any adopted cloud infrastructure service acts as if it had originally been fully configured and provisioned by the management layer into which it has been model adapted.

11. The article according to claim 10, wherein the adopted service is analyzed for compatibility with an existing service offering in the cloud environment management layer, and if compatible, associated with the existing service offering.

12. A system, comprising:
    a processor; and
    a memory coupled to the processor containing stored instructions to enable the system, in a cloud infrastructure environment having a compute layer, a network layer, a storage layer, and management layer, wherein the management layer has no knowledge of at least some of existing infrastructure services, to:
    select hosts containing host bus adapters and/or network adapters having unique identifiers, wherein the unique identifiers comprise world wide port names (WWPNs) and/or Internet protocol (IP) network adapters configured with IP addresses;
    use the unique identifiers to analyze the storage layer for:
    storage groups having host initiators that match the unique identifiers of the host bus adaptors; and/or
    network file storage (NFS) exports exposed to the unique identifiers as client IP addresses; and
    use storage ports in the storage groups with unique identifiers for the hosts to identify potential zones in a fabric of the storage area network (SAN), wherein the presence as zone members of one or more of the storage ports and one of the HBAs identified by one of the WWPNs in one of the zones indicates the zone can be in use as a SAN path in a cloud infrastructure service,
    wherein the storage volumes are potentially visible to and in use by other hosts in the cloud infrastructure environment, wherein the occurrence of at least one of the storage volumes being visible to and in use by more than one of the hosts in the cloud infrastructure environment indicates that the hosts form a cluster of hosts, and
    wherein the hosts identified as potential clusters of hosts are validated for adherence to business rules in the management layer including:
    each host in the potential cluster recognizing the exact same shared storage volumes (SAN-based and/or NFS-based); and
    each host in the environment having identical network configuration including:
        the same number of host bus adapters with matching names;

the same number of network adapters with matching names; and the same VLANs configured on each relative network adapter across hosts.

\* \* \* \* \*